(12) United States Patent
Wei et al.

(10) Patent No.: US 11,871,407 B2
(45) Date of Patent: Jan. 9, 2024

(54) METHOD OF PERFORMING HYBRID AUTOMATIC REPEAT REQUEST PROCESS FOR DEPRIORITIZED UPLINK GRANT AND RELATED DEVICE

(71) Applicant: FG Innovation Company Limited, Tuen Mun (HK)

(72) Inventors: Chia-Hung Wei, Taipei (TW); Heng-Li Chin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 244 days.

(21) Appl. No.: 17/018,151

(22) Filed: Sep. 11, 2020

(65) Prior Publication Data

US 2021/0084674 A1 Mar. 18, 2021

Related U.S. Application Data

(60) Provisional application No. 62/899,883, filed on Sep. 13, 2019.

(51) Int. Cl.
*H04W 72/12* (2023.01)
*H04W 72/14* (2009.01)
(Continued)

(52) U.S. Cl.
CPC ....... *H04W 72/1268* (2013.01); *H04L 1/1812* (2013.01); *H04W 72/21* (2023.01);
(Continued)

(58) Field of Classification Search
None
See application file for complete search history.

(56) References Cited

U.S. PATENT DOCUMENTS

2020/0245257 A1* 7/2020 Pelletier .............. H04W 52/146
2020/0259896 A1* 8/2020 Sachs ..................... H04L 67/10
(Continued)

FOREIGN PATENT DOCUMENTS

CN 109548409 A 3/2019
WO 2018060972 A1 4/2018

OTHER PUBLICATIONS

Mediatek Inc., Multiple HARQ procedures and intra-UE UCI prioritization, 3GPP TSG RAN WG1, Meeting#97, R1-1907724, May 17, 2019.
(Continued)

*Primary Examiner* — Steve R Young
(74) *Attorney, Agent, or Firm* — ScienBiziP, P.C.

(57) ABSTRACT

A method for a UE performing a Hybrid Automatic Repeat Request (HARQ) process for a deprioritized uplink (UL) grant is disclosed. The method comprises receiving, a first UL grant scheduling a first UL transmission on a first UL resource and a second UL grant scheduling a second UL transmission on a second UL resource, the second UL resource at least partially overlapping the first UL resource in a time domain, determining the first UL grant as a prioritized UL grant, determining the second UL grant as a deprioritized UL grant, performing the first UL transmission scheduled by the prioritized UL grant, receiving a third UL grant scheduling a retransmission on a third UL resource, the retransmission corresponding to the second UL transmission scheduled by the deprioritized UL grant and flushing a HARQ buffer of a HARQ process for the second UL transmission in response to receiving the third UL grant.

10 Claims, 7 Drawing Sheets

(51) Int. Cl.
*H04L 1/18* (2023.01)
*H04W 72/04* (2023.01)
*H04W 74/08* (2009.01)
*H04W 72/1268* (2023.01)
*H04L 1/1812* (2023.01)
*H04W 72/21* (2023.01)
*H04W 72/23* (2023.01)
*H04W 72/566* (2023.01)

(52) U.S. Cl.
CPC ......... *H04W 72/23* (2023.01); *H04W 72/569* (2023.01); *H04W 74/0833* (2013.01)

(56) References Cited

U.S. PATENT DOCUMENTS

| | | | | |
|---|---|---|---|---|
| 2021/0006362 A1* | 1/2021 | Loehr | | H04L 1/1819 |
| 2021/0029730 A1* | 1/2021 | Lou | | H04L 1/1812 |
| 2021/0195657 A1* | 6/2021 | Wu | | H04W 74/04 |
| 2022/0159708 A1* | 5/2022 | Alabbasi | | H04W 72/23 |
| 2022/0183050 A1* | 6/2022 | Marco | | H04L 1/1812 |

OTHER PUBLICATIONS

Hua Wei et al., Prioritization between configured and dynamic grants, 3GPP TSG-RAN WG2, Meeting#106, R2-1906505, May 17, 2019.

3GPP TS 38.331, "3rd Generation Partnership Project; Technical Specification Group Radio Access Network; NR; Radio Resource Control (RRC) protocol specification (Release 15)", V15.6.0 (Jun. 2019).

3GPP TS 38.321, "3rd Generation Partnership Project; Technical Specification Group Radio Access Network; NR; Medium Access Control (MAC) protocol specification (Release 15)", V15.6.0 (Jun. 2019).

3GPP TS 38.214, "3rd Generation Partnership Project; Technical Specification Group Radio Access Network; NR; Physical layer procedures for data (Release 15)", V15.6.0 (Jun. 2019).

\* cited by examiner

METHOD OF PERFORMING HYBRID AUTOMATIC REPEAT REQUEST PROCESS FOR DEPRIORITIZED UPLINK GRANT AND RELATED DEVICE

CROSS-REFERENCE TO RELATED APPLICATION(S)

The present disclosure claims the benefit of and priority to U.S. provisional Patent Application Ser. No. 62/899883 filed on Sep. 13, 2019, entitled "Retransmission of a TB for Deprioritized Dynamic Grant," (hereinafter referred to as "the '883 provisional"). The disclosure of the '883 provisional is hereby incorporated fully by reference into the present disclosure.

FIELD

The present disclosure generally relates to wireless communications, and more particularly, to a method of performing a Hybrid Automatic Repeat Request (HARQ) process and a related device.

BACKGROUND

Figure 1:
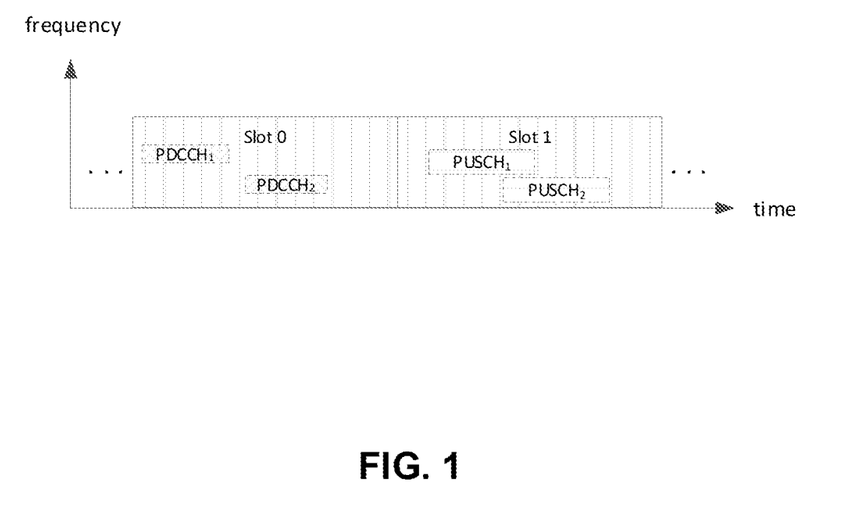
FIG. 1 is a schematic diagram illustrating two PUSCHs overlapped in a time domain, in accordance with related art methods.

In order to reduce data scheduling delay and data transmission delay in New Radio (NR) wireless communication system according to the related art, a user equipment (UE) may be granted by a next generation node B (gNB) with multiple uplink (UL) resources (e.g., two physical UL shared channel (PUSCH)) that are overlapped in a time domain such that two PUSCHs, or two UL grants are overlapped in a time domain. For example, a UE may receive two UL physical downlink (DL) control channel (PDCCH) grants (e.g., $PDCCH_1$ and $PDCCH_2$) in slot 0, and $PDCCH_1$ and $PDCCH_2$ indicate PUSCH resources (e.g., $PUSCH_1$ and $PUSCH_2$) in slot 1 respectively, wherein the $PUSCH_1$ and $PUSCH_2$ are overlapped in time, as shown in the FIG. 1. In this case, the UE may perform a prioritization procedure between the $PUSCH_1$ and $PUSCH_2$. The UE may select one of the two PUSCHs for UL data transmission. The PUSCH selected by the UE for UL data transmission is called as a prioritized PUSCH and the other PUSCH is called as a deprioritized PUSCH. However, there is no specification for a HARQ process for the deprioritized PUSCH since the deprioritized PUSCH may not be transmitted.

SUMMARY

The present disclosure provides a method of performing a HARQ process for a deprioritized UL grant and a related device.

According to an aspect of the present disclosure, a method for a UE performing a HARQ process for a deprioritized UL grant is disclosed. The method comprises receiving, from a base station (BS), a first UL grant scheduling a first UL transmission on a first UL resource and a second UL grant scheduling a second UL transmission on a second UL resource, the second UL resource at least partially overlapping the first UL resource in a time domain, determining the first UL grant as a prioritized UL grant, determining the second UL grant as a deprioritized UL grant, performing the first UL transmission scheduled by the prioritized UL grant, receiving a third UL grant scheduling a retransmission on a third UL resource, the retransmission corresponding to the second UL transmission scheduled by the deprioritized UL grant and flushing a HARQ buffer of a HARQ process for the second UL transmission in response to receiving the third UL grant.

According to another aspect of the present disclosure, a UE for performing a HARQ process for a deprioritized UL grant is disclosed. The UE comprises a processor, for executing computer-executable instructions, and a non-transitory machine-readable medium, coupled to the processor, for storing the computer-executable instructions, wherein the computer-executable instructions instruct the processor to perform the method.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DESCRIPTION

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series, and equivalents.

Additionally, any two or more of the following paragraphs, (sub)-bullets, points, actions, behaviors, terms, alternatives, examples, or claims in the following disclosure may be combined logically, reasonably, and properly to form a specific method. Any sentence, paragraph, (sub)-bullet, point, action, behaviors, terms, or claims in the following disclosure may be implemented independently and separately to form a specific method. Dependency, e.g., "based on", "more specifically", "preferably", "In one embodiment", "In one implementation", "In one alternative" etc., in the following disclosure refers to just one possible example that would not restrict the specific method.

For explanation and non-limitation, specific details, such as functional entities, techniques, protocols, and standards are set forth for providing an understanding of the disclosed technology. In other examples, a detailed description of well-known methods, technologies, system, and architectures are omitted so as not to obscure the description with unnecessary details.

Persons skilled in the art will recognize that any disclosed network function(s) or algorithm(s) may be implemented by hardware, software, or a combination of software and hardware. Disclosed functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the disclosed network function(s) or algorithm(s). The microprocessors or general-purpose computers may be formed of applications specific integrated circuitry (ASIC), programmable logic arrays, and/or using one or more digital signal processor (DSPs). Although some of the disclosed implementations are directed to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-A Pro system, or an New Radio (NR) system typically includes at least one base station (BS), at least one UE, and one or more optional network elements that provide connection with a network. The UE communicates with the network (e.g., a core network (CN), an evolved packet core (EPC) network, an Evolved Universal Terrestrial RAN (E-UTRAN), a Next-Generation (GN) Core (NGC), 5G CN (5GC), or an internet via a RAN established by the BS.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a personal digital assistant (PDA) with wireless communication capability. The UE is configured to receive and transmit signals over an air interface to one or more cells in a Radio Access Network (RAN).

A BS may include, but is not limited to, a node B (NB) as in the UMTS, an evolved node B (eNB) as in the LTE-A, a radio network controller (RNC) as in the UMTS, a BS controller (BSC) as in the Global System for Mobile communications (GSM)/GSM Enhanced Data rates for GSM Evolution (EDGE) RAN (GERAN), a Next Generation (NG)-eNB as in an Evolved Universal Terrestrial Radio Access (E-UTRA) BS in connection with the 5GC, a gNB as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wideband-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the DL and optionally UL resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe), LTE SL service, and LTE/NR V2X services. Each cell may have overlapped coverage areas with other cells.

Figure 2:
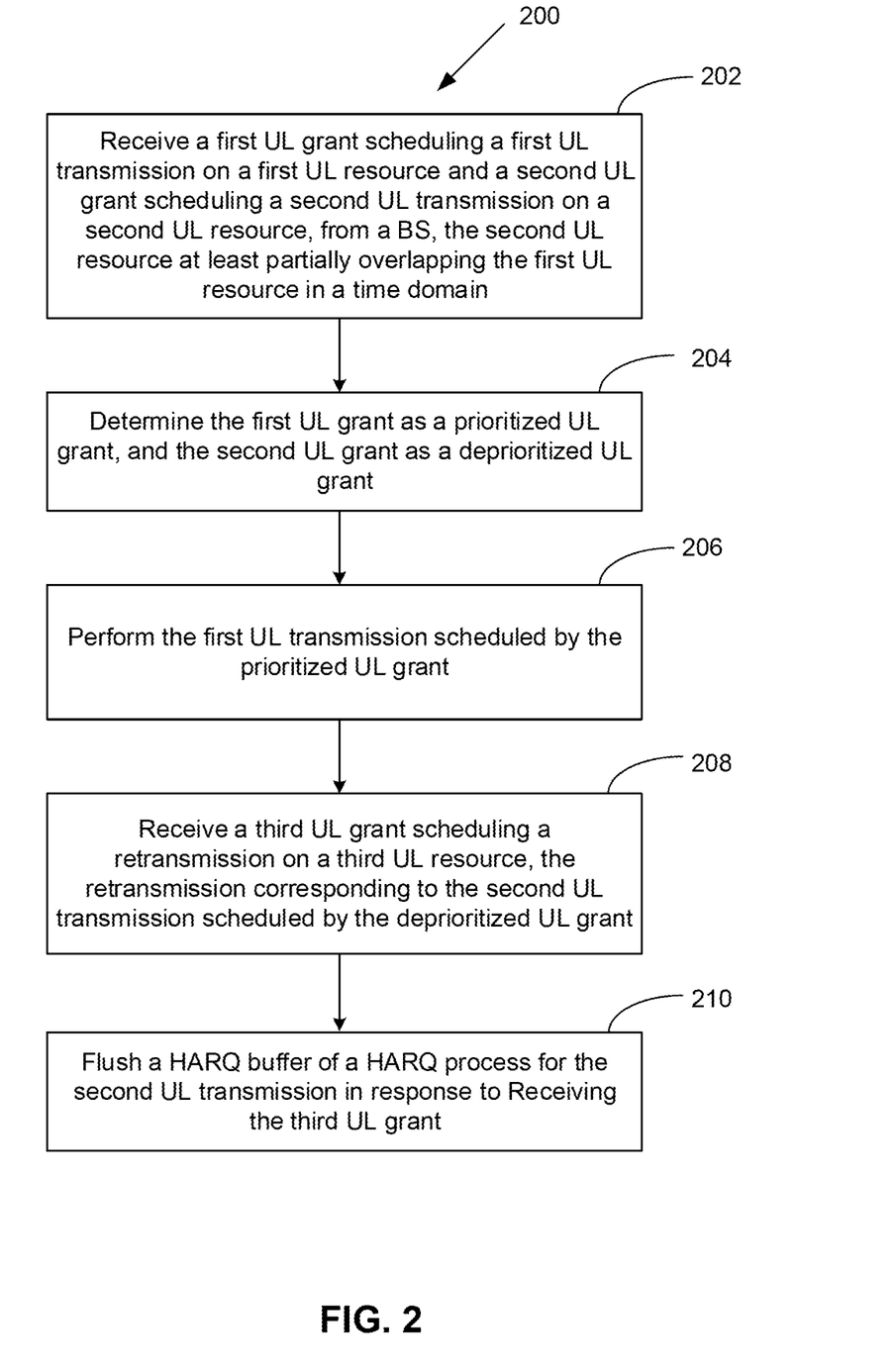
FIG. 2 is a flowchart illustrating a HARQ process for a deprioritized PUSCH, in accordance with example implementations of the present disclosure.

FIG. 2 is a flowchart illustrating a HARQ process 200 for a deprioritized PUSCH, in accordance with example implementations of the present disclosure. In action 202, the UE receives a first UL grant scheduling a first UL transmission on a first UL resource and a second UL grant scheduling a second UL transmission on a second UL resource, from a BS, the second UL resource at least partially overlapping the first UL resource in a time domain. In action 204, the UE determines the first UL grant as a prioritized UL grant, and the second UL grant as a deprioritized UL grant. In action 206, the UE performs the first UL transmission scheduled by the prioritized UL grant. In action 208, the UE receives a third UL grant scheduling a retransmission corresponding to the second UL transmission scheduled by the deprioritized UL grant, on a third UL resource. In action 210, the UE flushes a HARQ buffer of a HARQ process for the second UL transmission in response to the third UL grant being received. Moreover, the UE may generate a MAC Protocol Data Unit (PDU) that is included in a transport block (TB) for the second UL transmission, and transmit the MAC PDU on the third UL resource, to the BS.

It is noted that an UL grant of the present disclosure may be a dynamic grant (DG) or a configured grant (CG), and an UL resource of the present disclosure may be a PUSCH, a physical UL control channel (PUCCH) or a physical random access channel (PRACH). Therefore, an UL resource conflict (e.g., UL resources overlapped in a time domain) may occur between DG PUSCHs, between CG PUSCHs, or between a DG PUSCH and CG PUSCH. In other implementations, the UL resource overlapped in a time domain may also between any two or more PUSCHs/PUCCHs/PRACHs.

In one implementation, priorities of UL grants may be configured by the BS or predefined in the UE. In other implementations, the UE may determine the priorities of the UL grants according to a prioritization procedure, which is associated with a logical channel prioritization (LCP). For example, the UE may perform the prioritization procedure for the UL grants (e.g., CG and/or DG) scheduling an UL transmission on an UL resource (e.g., PUSCH). The UL grant that is determined as a high priority is referred to as a prioritized UL grant, and the other UL grant that is determined as a lower priority is referred to as a deprioritized UL grant. In some examples, the UL resource indicated by the prioritized UL grant may be called a "prioritized UL resource", whereas the UL resource indicated by the decreolized UL grant may be called a "deprioritized UL resource."

In one implementation, the UE may determine whether a size of the third UL resource is different from a size of a transport block (TB) corresponding to the second UL transmission and stored in the HARQ buffer of the HARQ process, and flush the HARQ buffer of the HARQ process for the second UL transmission when the size of the third UL resource is different from the size of the TB.

In one implementation, the UE may flush the HARQ buffer of the HARQ process for the second UL transmission only when a TB corresponding to the second UL transmission has not been generated by the UE.

Figure 3:
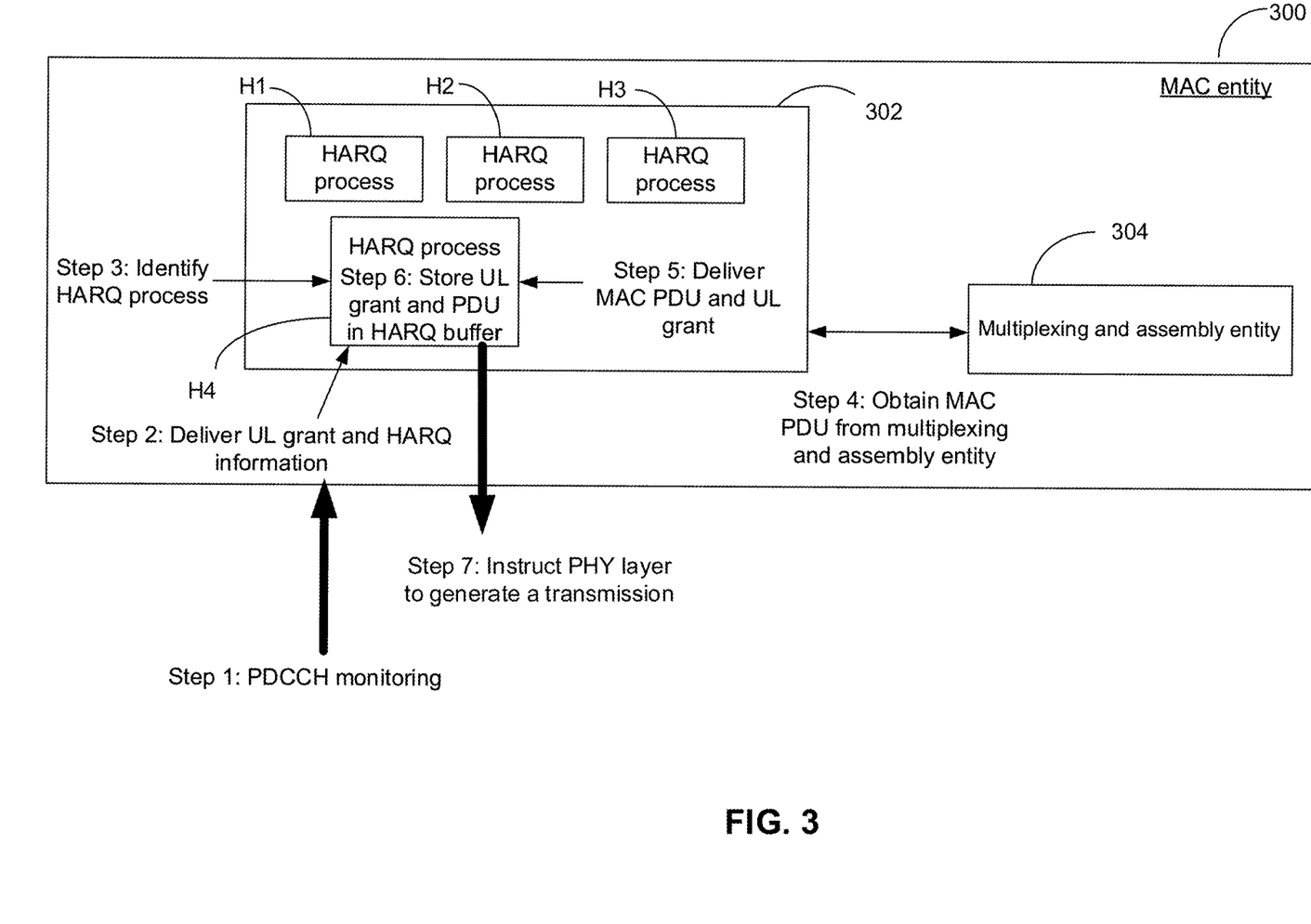
FIG. 3 is a schematic diagram illustrating an operation of a Medium Access Control (MAC) entity, in accordance with example implementations of the present disclosure.

FIG. 3 is a schematic diagram illustrating an operation of a Medium Access Control (MAC) entity 300, in accordance with example implementations of the present disclosure. With reference to FIG. 3, the MAC entity 300 of the UE includes a HARQ entity 302 for each serving cell with a configured UL (e.g., a supplementary UL carrier), which maintains a number of parallel HARQ processes H1-H4. The number of parallel HARQ processes in the HARQ entity 302 may be either predefined in the 3GPP specification or per cell group preconfigured by a gNB via a radio resource control (RRC) message. Each HARQ process supports one TB.

A PDCCH indicates a PUSCH transmission for a UE. The UE may perform a HARQ process for the PUSCH transmission by the following steps as illustrated in FIG. 3.

Step 1: The UE monitors PDCCH candidates according to a gNB's configuration. An UL grant is received on a PDCCH. In an example, the UE's specific DL control information (DCI) (e.g., with cyclic redundancy check (CRC) scrambled by the UE's specific Radio Network Temporary Identity (RNTI) (e.g., Cell-RNTI (C-RNTI)) is decoded on the PDCCH. The MAC entity 300 may receive an UL grant on the PDCCH, and HARQ information that includes a new data indicator (NDI), from a physical (PHY) layer. A PUSCH may be indicated by the UL grant.

Step 2: The MAC entity 300 determines a type of the UL grant. and the type determination may be evaluated according to whether the UL grant is used for a MAC entity's C-RNTI, Temporary C-RNTI, or CS-RNTI and/or whether the NDI of the UL grant is toggled or not. The MAC entity 300 further indicates the presence of the UL grant and delivers the UL grant and HARQ information to the HARQ entity 302.

Step 3: The HARQ entity 302 identifies the HARQ process H4 associated with the UL grant.

Step 4: The HARQ entity 302 further determines whether the NDI of the UL grant is toggled or not compared to the value in the previous transmission of a TB of the identified HARQ process H4. If the NDI has been toggled, the HARQ entity 302 may obtain a MAC PDU to transmit from the multiplexing and assembly entity 304.

On the other hand, if the NDI has not been toggled, the HARQ entity 302 either ignores the UL grant (e.g., no data needed to be transmitted) or delivers the UL grant and the HARQ information (redundancy version (RV)) of the TB to the identified HARQ process H4 and instructs the identified HARQ process H4 to trigger a retransmission.

Step 5: After the MAC PDU to be transmitted has been obtained, the HARQ entity 302 delivers the MAC PDU, the UL grant, and the HARQ information of the TB to the identified HARQ process H4, and the HARQ entity 302 instructs the identified HARQ process H4 to trigger a new transmission.

Step 6: The identified HARQ process H4 stores the MAC PDU in the associated HARQ buffer and the identified HARQ process H4 stores the UL grant received from the HARQ entity 302, and then generates a transmission.

Step 7: The identified HARQ process H4 instructs the PHY layer to generate a transmission according to the stored UL grant.

It is noted that not all the previously disclosed steps for the PUSCH transmission of the UE need to be completely implemented. Only a subset of the steps may be implemented. Also, the sequence of the steps may be changed.

UL resource conflict may occur between a first DG PUSCH and second DG PUSCH. Generally, the DG PUSCHs conflict may happen to a UE within a specific time period. The specific time period starts when the UE receives a first UL grant and ends at before the transmission of a first TB of a first PUSCH indicated by the first UL grant. Within the specific period, the UE receives a second UL grant indicating a second PUSCH, which overlaps the first PUSCH. Based on the timing when the UE receives the second UL grant, the first TB may either be generated already or not generated yet. For example, if the second UL grant is received before step 4 of the HARQ process illustrated in FIG. 3 corresponding to the first UL grant, the TB of the HARQ process may not be generated. On the contrary, if the second UL grant is received after step 4 of the HARQ process illustrated in FIG. 3, the TB of the HARQ process may be generated by the UE. That is, two situations are disclosed.

Situation I: the TB of the corresponding HARQ process has not been generated.

Situation II: the TB of the corresponding HARQ process has been generated.

In the following, a HARQ process for a deprioritized DG PUSCH is addressed.

Figure 4:
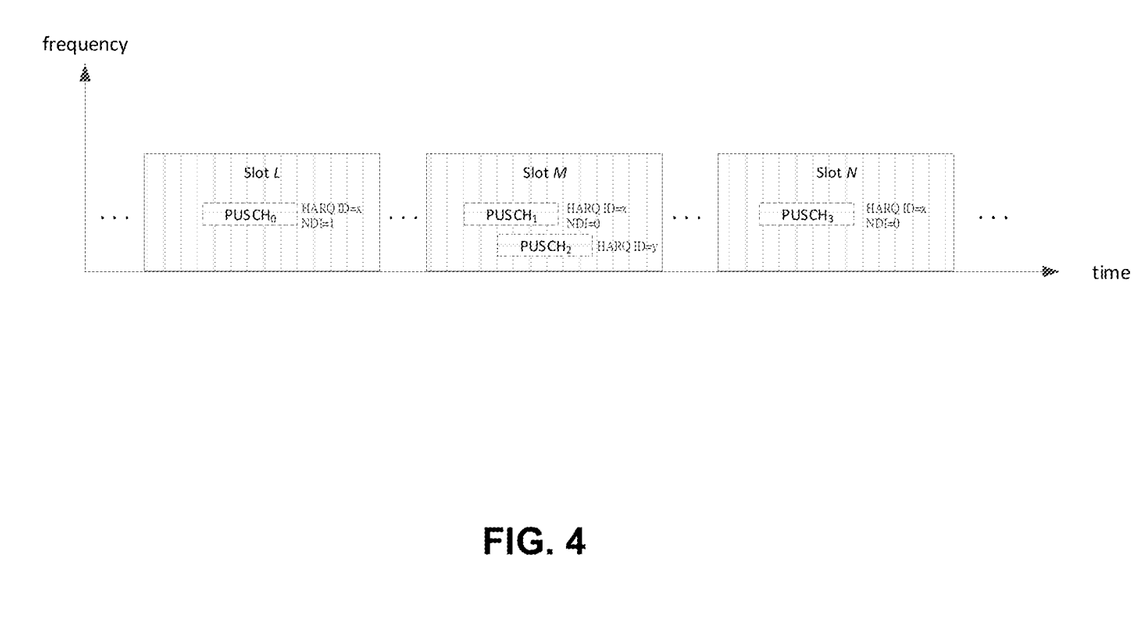
FIG. 4 is a schematic diagram illustrating two dynamic grant (DG) PUSCHs overlapped in a time domain, in accordance with example implementations of the present disclosure.

FIG. 4 is a schematic diagram illustrating two dynamic grant (DG) PUSCHs overlapped in a time domain, in accordance with example implementations of the present disclosure. In slot M, the $PUSCH_1$ conflict with the $PUSCH_2$ for a UE. The HARQ process identifier (ID) (e.g., "HARQ ID" of FIG. 4) of the HARQ process for the $PUSCH_1$, and the value of NDI of the corresponding HARQ ID are 'x' and '0' respectively. The HARQ ID of the HARQ process for the PUSCH$_2$ is 'y'. In present disclosure, a HARQ process with HARQ process ID x may also be denoted as HARQ process x. A HARQ process with HARQ process ID y may also be denoted as HARQ process y. The UE performs a prioritization procedure between the PUSCH$_1$ and PUSCH$_2$ for resolving PUSCH conflict. In this example, the PUSCH$_2$ is the prioritized PUSCH and PUSCH$_1$ is the deprioritized PUSCH as the outcome of the prioritization procedure. The UE performs a transmission on the prioritized PUSCH$_2$. After a duration of the PUSCH$_2$, for example in slot N, the UE is granted the PUSCH$_3$ by the gNB for a retransmission of the TB for the PUSCH$_1$. That is, the UE is granted the PUSCH$_3$ with a corresponding HARQ ID and NDI value that are the same as the PUSCH$_1$ (e.g., 'x' and '0' respectively). It is noted that the deprioritized PUSCH$_1$ is a DG granted by the gNB for a new transmission (e.g., the NDI value for the HARQ ID 'x' is indicated as toggled (e.g., the NDI changed from '1' (for PUSCH$_0$) to '0' (for PUSCH$_1$)). That is, the PUSCH$_0$ with HARQ ID='x' and the value of NDI='1' is represented. However, a TB for the PUSCH$_1$ may or may not be generated (e.g., situation I or situation II previously disclosed) before the UE determines that PUSCH$_1$ is conflicted with the PUSCH$_2$, or before the prioritization between the PUSCH$_1$ and PUSCH$_2$ is performed. If the TB for the PUSCH$_1$ is classified as situation I, the UE may not transmit the deprioritized PUSCH$_1$ and may not generate a TB for the PUSCH$_1$. In this case, the TB for the PUSCH$_0$ may be stored in the HARQ buffer of the HARQ process x (e.g., with HARQ ID='x') when the UE is granted the PUSCH$_3$. Thus, when the UE is granted the PUSCH$_3$ for a retransmission of the TB for the PUSCH$_1$, the UE may instruct the HARQ process x (e.g., with HARQ ID='x') to transmit the TB stored in the HARQ buffer of the HARQ process x (e.g., with HARQ ID='x'). However, the TB stored in the HARQ buffer of the HARQ process x (e.g., with HARQ ID='x') is the TB that is transmitted to the gNB and corresponds to the PUSCH$_0$. In other words, there is no TB for the PUSCH$_1$ stored in the HARQ buffer of the HARQ process x (e.g., with HARQ ID='x') for the retransmission. In addition, the TB stored in the HARQ buffer of the HARQ process x (e.g., with HARQ ID='x') may have a different size than a resource size of the PUSCH$_3$.

As for the PUSCH$_3$ in the slot N of FIG. 4, since the HARQ entity of the UE may determine the NDI of the PUSCH$_3$ as non-toggled, the UE may deliver the UL grant and the HARQ information (redundancy version and HARQ ID='x') of the PUSCH$_3$ to the HARQ process x of the HARQ entity of the UE, and may instruct the HARQ process x to trigger a retransmission. During the retransmission, as illustrated in steps 6 and 7 of FIG. 3, the HARQ process x may transmit the TB for the PUSCH$_0$, which is stored in the HARQ buffer of the HARQ process x, on the PUSCH$_3$. However, as previously disclosed, the TB stored in the HARQ buffer of the HARQ process x is the TB that has been transmitted to the gNB, which is not the retransmission of the TB for the PUSCH$_1$.

Therefore, methods for the UE to perform a HARQ process for the deprioritized PUSCH$_1$ are disclosed, to perform the retransmission for the deprioritized PUSCH$_1$ with the PUSCH$_3$.

Figure 5:
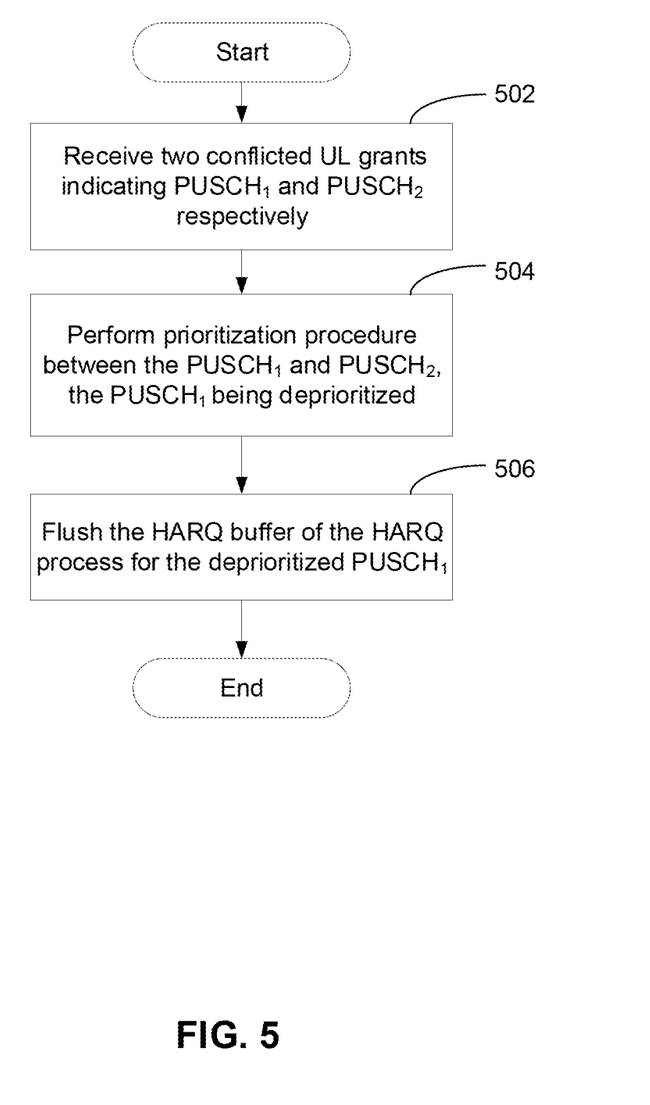
FIG. 5 is a schematic diagram illustrating a HARQ process of a deprioritized DG PUSCH by flushing a corresponding HARQ buffer, in accordance with example implementations of the present disclosure.

Method 1: HARQ Process of the Deprioritized DG PUSCH by Flushing a Corresponding HARQ Buffer FIG. 5 is a schematic diagram illustrating a HARQ process of a deprioritized DG PUSCH by flushing a corresponding HARQ buffer, in accordance with example implementations of the present disclosure. With reference to FIG. 5, the UE receives the PUSCH$_1$ conflicted with the PUSCH$_2$ (e.g., action 502), wherein the PUSCH$_1$ is scheduled for a new transmission.

The UE performs a prioritization procedure between the PUSCH$_1$ and PUSCH$_2$ (e.g., action 504). The PUSCH$_2$ is the prioritized PUSCH and the PUSCH$_1$ is the deprioritized PUSCH. The UE flushes the HARQ buffer of the HARQ process for the deprioritized PUSCH$_1$ (e.g., action 506).

In one implementation, the HARQ entity of the UE may flush the HARQ buffer of the HARQ process indicated to be applied for the deprioritized PUSCH$_1$.

In one implementation, the HARQ entity of the UE may flush the HARQ buffer of the HARQ process for the deprioritized PUSCH$_1$ only when the TB corresponding to the deprioritized PUSCH$_1$ has not been generated.

In one implementation, the HARQ entity of the UE may flush the HARQ buffer of the HARQ process for the deprioritized PUSCH$_1$ if the HARQ entity of the UE has not started to obtain the MAC PDU from the multiplexing and assembly entity of the UE for transmission.

Based on the HARQ process illustrated in FIG. 3, the HARQ entity 302 of the UE may only flush the HARQ buffer of the HARQ process for the deprioritized PUSCH$_1$ before the UE starts to perform a specific step (e.g., one of the steps 1-7 illustrated FIG. 3) of the HARQ process.

In some implementations, the HARQ entity of the UE may flush the HARQ buffer of the HARQ process for the deprioritized PUSCH$_1$ if the size of the UL resource granted for the PUSCH$_3$ is different from the TB stored in the HARQ buffer of the HARQ process for the PUSCH$_3$ or deprioritized PUSCH$_1$.

In one example, the MAC entity of the UE may determine whether the size of the UL resource granted for the PUSCH$_3$ is different from the TB stored in the HARQ buffer of the HARQ process for the PUSCH$_3$. If the size is different, the MAC entity instructs the HARQ entity of the UE to flush the HARQ buffer of the HARQ process for the deprioritized PUSCH$_1$.

In one example, the MAC entity of the UE may determine whether the size of the UL resource granted for the PUSCH$_3$ is different from the TB stored in the HARQ buffer of the HARQ process for the PUSCH$_3$. If the size is different, the MAC entity instructs the HARQ entity of the UE to flush the HARQ buffer of the HARQ process for the deprioritized PUSCH$_1$ before the MAC entity delivers the HARQ information and/or UL grant to the HARQ process.

If the TB corresponding to the PUSCH$_1$ has been obtained and/or stored in the HARQ buffer, the HARQ entity of the UE indicates to the multiplexing and assembly entity 304 to include a specific MAC subPDU(s) from the obtained MAC PDU in the subsequent UL transmission if the size of the UL resource granted for the PUSCH$_3$ is different from the TB stored in the HARQ buffer of the HARQ process for the PUSCH$_3$.

If the TB corresponding to the PUSCH$_1$ has been obtained and/or stored in the HARQ buffer, the HARQ entity of the UE indicates to the multiplexing and assembly entity 304 to include a specific MAC subPDU(s) from the obtained MAC PDU in the subsequent UL transmission if the HARQ entity of the UE has obtained the MAC PDU from the multiplexing and assembly entity 304 for transmission. The specific MAC subPDU(s) may be, but not limited to, a MAC subPDU carrying a MAC Service Data Unit (SDU), a MAC subPDU carrying a MAC control element (CE), a MAC subPDU carrying a MAC SDU from a specific logical channel (associated with specific radio bearer (e.g., a Signaling Radio Bearer (SRB) or Data Radio Bearer (DRB)), or a MAC subPDU carrying a specific MAC CE.

Figure 6:
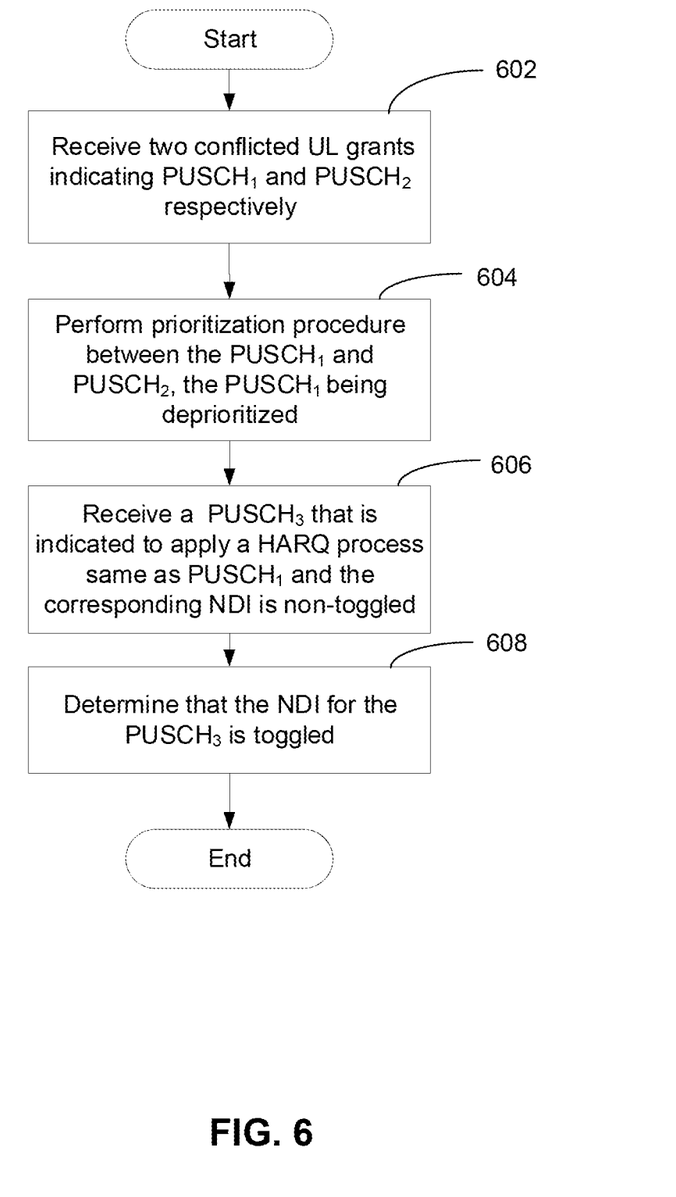
FIG. 6 is a schematic diagram illustrating a HARQ process of a deprioritized DG PUSCH by a new data indicator (NDI) toggle determination, in accordance with example implementations of the present disclosure.

Method 2: HARQ Process of the Deprioritized DG PUSCH by NDI Toggle Determination FIG. 6 is a schematic diagram illustrating a HARQ process of a deprioritized DG PUSCH by a new data indicator (NDI) toggle determination, in accordance with example implementations of the present disclosure. With reference to FIG. 6, the UE receives the PUSCH$_1$ conflicted with the PUSCH$_2$ (e.g., action 602), wherein the PUSCH$_1$ is scheduled for a new transmission. The UE performs a prioritization procedure between the PUSCH$_1$ and PUSCH$_2$ (e.g., action 604). The PUSCH$_2$ is the prioritized PUSCH and the PUSCH$_1$ is the deprioritized PUSCH. The UE is granted a PUSCH$_3$ (e.g., the corresponding HARQ ID is the same as the PUSCH$_1$, and NDI for the PUSCH$_3$ is non-toggled) for a retransmission of the TB corresponding to the PUSCH$_1$ (e.g., action 606). The HARQ entity of the UE may determine that the NDI for the PUSCH$_3$ is toggled (e.g., action 608).

In one implementation, the HARQ entity of the UE may determine that the NDI for the PUSCH$_3$ has been toggled only when the TB corresponding to the deprioritized PUSCH$_1$ has not been generated.

In one implementation, the HARQ entity of the UE may determine that the NDI for the PUSCH$_3$ is toggled if the HARQ entity of the UE has not started to obtain a MAC PDU (for PUSCH$_1$) to transmit, from the multiplexing and assembly entity.

Based on the HARQ process of FIG. 3, the HARQ entity of the UE may only determine that the NDI for the PUSCH$_3$ is toggled before the UE starts to perform a specific step (one of the steps 1-7 illustrated in FIG. 3) of the HARQ process for the PUSCH$_1$.

In some implementations, the UE (or the HARQ entity of the UE) may check whether the UL resource granted for the PUSCH$_3$ is different from the TB stored in the HARQ buffer of the HARQ process for the PUSCH$_3$. The HARQ entity of the UE may determine that the NDI for the PUSCH$_3$ is toggled if the size of the UL resource granted for the PUSCH$_3$ is different from the TB stored in the HARQ buffer of the HARQ process for the PUSCH$_3$.

In the present disclosure, an UL grant is either received dynamically on the PDCCH, in a Random Access Response (RAR) or configured semi-persistently by RRC signaling. The MAC entity may have an UL grant to transmit on the UL shared channel (UL-SCH).

In some implementations, if an UL grant has been received in the RAR, the HARQ entity may determine that the NDI is toggled for the corresponding HARQ process regardless of the value of the NDI when the following cases occur.

Case 1: the UL grant is used for the MAC entity's C-RNTI and the previous UL grant delivered to the HARQ entity for the same HARQ process is either an UL grant received for the MAC entity's CS-RNTI or a configured UL grant.

Case 2: the UL grant is used for the MAC entity's C-RNTI and the previous UL grant delivered to the HARQ entity for the same HARQ process is deprioritized.

Case 3: the UL grant is used for the MAC entity's C-RNTI and the previous UL grant delivered to the HARQ entity for the same HARQ process is deprioritized and the MAC PDU corresponding to the UL grant has not been obtained from the multiplexing and assembly entity.

Case 4: the UL grant is used for the MAC entity's C-RNTI and the previous UL grant delivered to the HARQ entity for the same HARQ process is deprioritized and the HARQ entity has not instructed the multiplexing and assembly entity to generate a MAC PDU.

It is noted that the deprioritized PUSCH previously disclosed may be a CG PUSCH.

It is noted that the deprioritized PUSCH previously disclosed may be applied for either the initial transmission resource of a DG PUSCH or any of the repetition transmission occasions.

It is noted that the deprioritized PUSCH may be applied for either the initial transmission resource of a CG PUSCH or any of the transmission occasions of 'K' repetitions associated with RV=0 (as defined in the 3GPP TS 38.214 section 6.1.2.3.1).

It is noted that all the cases, examples, and implementations previously disclosed may be applied for the deprioritized PUSCH due to an intra UE prioritization between a PUSCH and a PUCCH. For example, the PUSCH may be deprioritized by a PUCCH transmission that overlaps the PUSCH duration.

It is noted that all the cases, examples, and implementations previously disclosed may be applied for the deprioritized PUSCH due to an intra UE prioritization between a PUSCH and a PRACH. For example, the PUSCH may be deprioritized by a PRACH transmission that overlaps the PRACH occasion.

It is noted that all the cases, example, and implementations previously disclosed may be applied for a suspended/interrupted/canceled PUSCH transmission due to a specific event, measurement gap, any other transmission, any radio resource configuration change (e.g., the PUSCH was granted on the flexible symbol, but reconfigured as a DL symbol).

Figure 7:
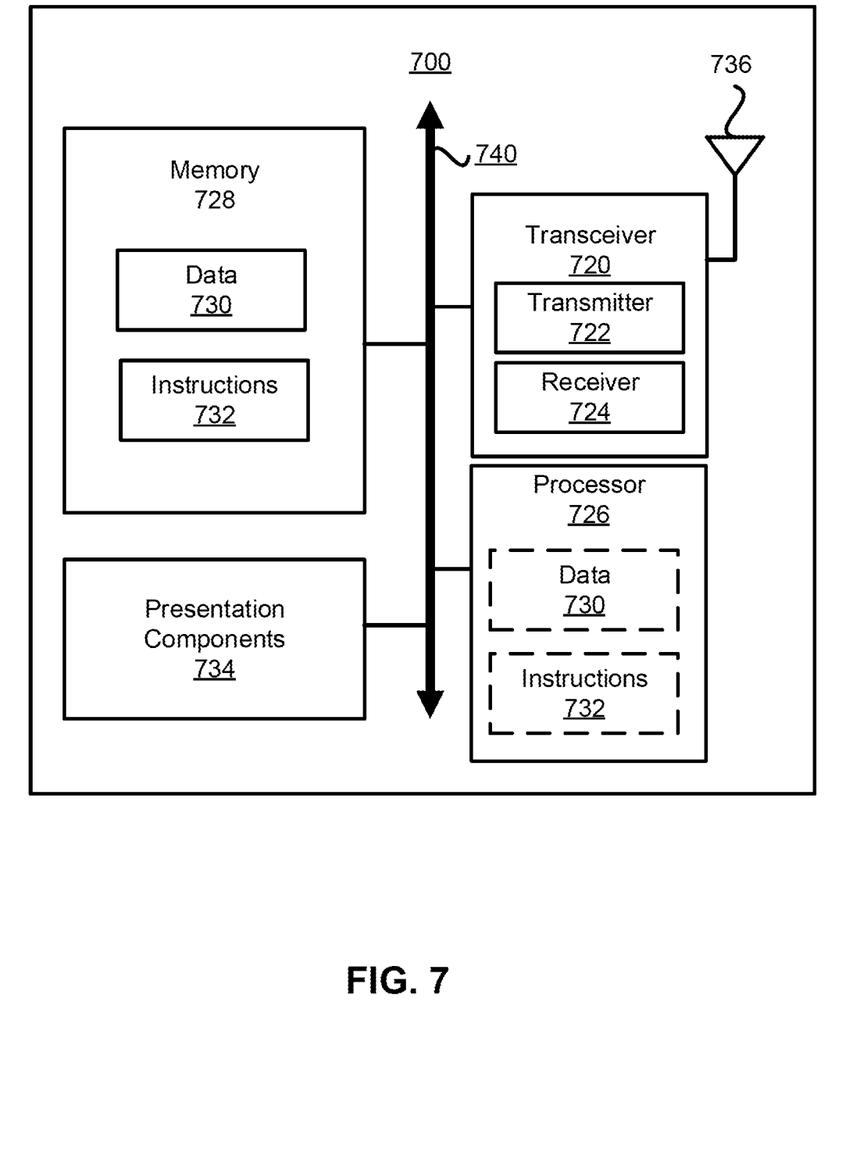
FIG. 7 is a block diagram illustrating a node for wireless communication, in accordance with example implementations of the present disclosure.

FIG. 7 is a block diagram illustrating a node 700 for wireless communication, in accordance with example implementations of the present disclosure.

As illustrated in FIG. 7, the node 700 may include a transceiver 720, a processor 726, memory 728, one or more presentation components 734, and at least one antenna 736. The node 700 may also include a Radio Frequency (RF) spectrum band module, a BS communications module, a network communications module, and a system communications management module, input/output (I/O) ports, I/O components, and a power supply (not illustrated). Each of these components may be in communication with each other, directly or indirectly, over one or more buses 740. The node 700 may be a UE that performs various disclosed functions as illustrated in FIG. 2.

The transceiver 720 includes a transmitter 722 (with transmitting circuitry) and a receiver 724 (with receiving circuitry) and may be configured to transmit and/or receive time and/or frequency resource partitioning information. The transceiver 720 may be configured to transmit in different types of subframes and slots including, but not limited to, usable, non-usable and flexibly usable subframes and slot formats. The transceiver 720 may be configured to receive data and control channels.

The node 700 may include a variety of computer-readable media. Computer-readable media may be any media that can be accessed by the node 700 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules or other data.

Computer storage media includes RAM, ROM, EEPROM, flash memory or other memory technology, Compact Disc Read-Only Memory (CD-ROM), digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, RF, infrared and other wireless media. Combinations of any of the disclosed media should be included within the scope of computer-readable media.

The memory 728 may include computer-storage media in the form of volatile and/or non-volatile memory. The memory 728 may be removable, non-removable, or a combination thereof. Memory includes solid-state memory, hard drives, and optical-disc drives. As illustrated in FIG. 7, the memory 728 may store computer-readable, computer-executable instructions 732 (e.g., software codes) that are configured to cause the processor 726 (e.g., processing circuitry) to perform various disclosed functions. Alternatively, the instructions 732 may be configured to cause the node 700 (e.g., when compiled and executed) to perform various disclosed functions.

The processor 726 may include an intelligent hardware device (e.g., a central processing unit (CPU), a microcontroller, an Application Specific Integrated Circuit (ASIC), etc.). The processor 726 may include memory. The processor 726 may process the data 730 and the instructions 732 received from the memory 728, and information received via the transceiver 720, the baseband communications module, and/or the network communications module. The processor 726 may also process information to be sent to the transceiver 720 for transmission via the antenna 736, to the network communications module for transmission to a CN.

One or more presentation components 734 present data to a person or other device. Presentation components 734 include a display device, speaker, printing component, and vibrating component.

From the present disclosure, it is evident that various techniques can be utilized for implementing the concepts of the present disclosure without departing from the scope of those concepts. Moreover, while the concepts have been disclosed with specific reference to certain implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the particular disclosed implementations, but that many rearrangements, modifications, and substitutions are possible without departing from the scope of the present disclosure.

What is claimed is:

1. A method for a user equipment (UE) performing a Hybrid Automatic Repeat Request (HARQ) process of an uplink (UL) grant for scheduling a retransmission, the method comprising:
   receiving, from a base station (BS), a first UL grant scheduling a first UL transmission on a first UL resource and a second UL grant scheduling a second UL transmission on a second UL resource, the second UL resource at least partially overlapping the first UL resource in time domain;
   determining the first UL grant as a prioritized UL grant;
   determining the second UL grant as a deprioritized UL grant;
   performing the first UL transmission scheduled by the prioritized UL grant;
   receiving a third UL grant scheduling a third UL transmission on a third UL resource; and
   before generating a first transport block for the third UL transmission in response to determining that the third UL grant is for indicating a retransmission of a second transport block stored in a HARQ buffer of the HARQ process:
   determining whether a size of the third UL resource is different from a size of the second transport block corresponding to the second UL transmission, and
   flushing the HARQ buffer and determining that a new data indicator (NDI) for the third UL transmission is toggled if the size of the third UL resource is different from the size of the second transport block, wherein:
   the third UL resource is not overlapping the first UL resource in the time domain and is not overlapping the second UL resource in the time domain, and
   the second UL grant is a configured grant (CG) and the third UL grant is a dynamic grant (DG).

2. The method of claim 1, wherein the first UL grant comprises the DG or the CG.

3. The method of claim 1, wherein any of the first UL resource, the second UL resource, and the third UL resource is used for a physical uplink shared channel (PUSCH) transmission, a physical uplink control channel (PUCCH) transmission, or a physical random access channel (PRACH) transmission.

4. The method of claim 1, wherein flushing the HARQ buffer further comprises:
   flushing the HARQ buffer when the second transport block corresponding to the second UL transmission has not been generated by the UE.

5. The method of claim 1, further comprising:
   generating a Medium Access Control (MAC) Protocol Data Unit (PDU) associated with the second transport block corresponding to the second UL transmission; and
   transmitting, to the BS, the MAC PDU on the third UL resource.

6. A user equipment (UE) for performing a Hybrid Automatic Repeat Request (HARQ) process of an uplink (UL) grant for scheduling a retransmission, the UE comprising:
   at least one processor; and
   at least one non-transitory machine-readable medium coupled to the at least one processor and storing computer-executable instructions that, when executed by the at least one processor, cause the UE to:
   receive, from a base station (BS), a first UL grant scheduling a first UL transmission on a first UL resource and a second UL grant scheduling a second UL transmission on a second UL resource, the second UL resource at least partially overlapping the first UL resource in time domain;
determine the first UL grant as a prioritized UL grant;
determine the second UL grant as a deprioritized UL grant;
perform the first UL transmission scheduled by the prioritized UL grant;
receive a third UL grant scheduling a third UL transmission on a third UL resource; and
before generating a first transport block for the third UL transmission in response to determining that the third UL grant is for indicating a retransmission of a second transport block stored in a HARQ buffer of the HARQ process:
determine whether a size of the third UL resource is different from a size of the second transport block corresponding to the second UL transmission, and
flush the HARQ buffer and determine that a new data indicator (NDI) for the third UL transmission is toggled if the size of the third UL resource is different from the size of the second transport block, wherein:
the third UL resource is not overlapping the first UL resource in the time domain and is not overlapping the second UL resource in the time domain, and
the second UL grant is a configured grant (CG) and the third UL grant is a dynamic grant (DG).

7. The UE of claim 6, wherein the first UL grant comprises the DG or the CG.

8. The UE of claim 6, wherein any of the first UL resource, the second UL resource, and the third UL resource is used for a physical uplink shared channel (PUSCH) transmission, a physical uplink control channel (PUCCH) transmission, or a physical random access channel (PRACH) transmission.

9. The UE of claim 6, wherein flushing the HARQ buffer further comprises:
flushing the HARQ buffer when the second transport block corresponding to the second UL transmission has not been generated by the UE.

10. The UE of claim 6, wherein the computer-executable instructions, when executed by the at least one processor, further cause the UE to:
generate a Medium Access Control (MAC) Protocol Data Unit (PDU) associated with the second transport block corresponding to the second UL transmission; and
transmit, to the BS, the MAC PDU on the third UL resource.

* * * * *